United States Patent
Denda et al.

(10) Patent No.: US 8,916,625 B2
(45) Date of Patent: Dec. 23, 2014

(54) INK JET RESIN INK COMPOSITION, INK JET RECORDING METHOD, AND RECORDED MATTER

(71) Applicant: Seiko Epson Corporation, Tokyo (JP)

(72) Inventors: Atsushi Denda, Chino (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/657,264

(22) Filed: Oct. 22, 2012

(65) Prior Publication Data

US 2013/0108841 A1    May 2, 2013

(30) Foreign Application Priority Data

Oct. 27, 2011 (JP) ................................ 2011-236293

(51) Int. Cl.
*C08G 63/00* (2006.01)
*C09D 11/38* (2014.01)
*C09D 11/322* (2014.01)
*C09D 11/102* (2014.01)

(52) U.S. Cl.
CPC .............. *C09D 11/322* (2013.01); *C09D 11/38* (2013.01); *C09D 11/102* (2013.01)
USPC ......................................... 523/160; 523/161

(58) Field of Classification Search
USPC ................................................. 523/160, 161
See application file for complete search history.

(56) References Cited

U.S. PATENT DOCUMENTS

| | | | |
|---|---|---|---|
| 5,519,085 A * | 5/1996 | Ma et al. ........................ | 524/503 |
| 6,857,733 B2 * | 2/2005 | Issler ............................. | 347/100 |
| 7,763,108 B2 | 7/2010 | Oyanagi et al. | |
| 2008/0257211 A1 * | 10/2008 | Oriakhi ......................... | 106/31.65 |
| 2009/0304927 A1 * | 12/2009 | Kamibayashi et al. ........ | 427/258 |
| 2009/0308279 A1 | 12/2009 | Koganehira et al. | |
| 2010/0289848 A1 * | 11/2010 | Koganehira et al. ........... | 347/20 |
| 2011/0300298 A1 * | 12/2011 | Kamibayashi et al. ........ | 427/256 |

FOREIGN PATENT DOCUMENTS

| | | |
|---|---|---|
| EP | 1942157 A2 | 7/2008 |
| JP | 2008-174712 | 7/2008 |
| JP | 2010-000788 A | 1/2010 |
| WO | 03-045698 | 6/2003 |

OTHER PUBLICATIONS

Extended European Search Report for Application No. EP 12 18 7895 dated Oct. 1, 2014 (6 pages).

* cited by examiner

*Primary Examiner* — Doris Lee
(74) *Attorney, Agent, or Firm* — Harness, Dickey & Pierce, P.L.C.

(57) ABSTRACT

An ink jet resin ink composition which is caused to adhere onto a glitter region that contains a glitter pigment, includes: at least one kind of resin selected from a urethane-based resin, an ester-based resin, and a fluorene-based resin, wherein glass-transition temperatures (Tg) of the urethane-based resin and the ester-based resin are higher than or equal to $-70°$ C. and less than or equal to $80°$ C., and a glass-transition temperature (Tg) of the fluorene-based resin is higher than or equal to $0°$ C.

14 Claims, No Drawings

INK JET RESIN INK COMPOSITION, INK JET RECORDING METHOD, AND RECORDED MATTER

Priority is claimed under 35 U.S.C. §119 to Japanese Application No. 2011-236293, filed on Oct. 27, 2011, which is hereby incorporated by reference in its entirety.

BACKGROUND

1. Technical Field

The present invention relates to an ink jet resin ink composition, an ink jet recording method, and a recorded matter.

2. Related Art

Hitherto, various methods of recording an image onto a recording medium have been known. For example, in an ink jet recording method, an image or text is recorded on a recording medium by minute ink droplets discharged from nozzle holes of an ink jet recording head.

The image recorded on the recording medium requires having favorable gloss properties in terms of sharpness, clarity, and the like. For example, in JP-T-2005-532924, a technique of, using an ink that contains a colorant and an ink that does not contain a colorant, recording an image having uniform gloss properties on a recording medium by printing the image with the ink that does not contain the colorant only at positions where the ink that contains the colorant is not present on the recording medium is described.

Regarding such properties as the gloss properties required of an image, recently, an image having metallic gloss properties receives attention due to having unique designability. The image having metallic gloss properties is formed using, for example, a glitter ink composition that contains a glitter pigment (for example, gold powder or silver powder produced from brass, aluminum fine particles, and the like) (refer to JP-A-2008-174712).

However, the image recorded on the recording medium may be placed in various environments and thus requires having water resistance.

In a case where an image having metallic gloss properties is formed using the glitter ink composition as described above, favorable metallic gloss properties may be exhibited by densely arranging the glitter pigment on the recording medium. However, when a non-volatile component is contained in the glitter ink composition, depending on the kind and the content thereof, there may be cases where it is difficult for the glitter pigment to be densely arranged. In order to solve such inconveniences, for example, when the content of a resin component in the glitter ink is reduced, the fixability of the recorded image is degraded, resulting in the degradation in the scratch resistance of the image.

On the other hand, there may be cases where the water resistance of the image having metallic gloss properties is not excellent.

SUMMARY

An advantage of some aspects of the invention is that it provides an ink jet resin ink composition capable of forming a glitter region having excellent scratch resistance and water resistance while maintaining metallic gloss properties.

The invention can be realized in the following forms or application examples.

Application Example 1

According to an aspect of the invention, there is provided an ink jet resin ink composition which is caused to adhere onto a glitter region that contains a glitter pigment, including: at least one kind of resin selected from a urethane-based resin, an ester-based resin, and a fluorene-based resin.

According to the ink jet resin ink composition of Application Example 1, the glitter region having excellent scratch resistance and water resistance may be formed while maintaining metallic gloss properties.

Application Example 2

In Application Example 1, glass-transition temperatures (Tg) of the urethane-based resin and the ester-based resin may be higher than or equal to −70° C. and less than or equal to 80° C., and a glass-transition temperature (Tg) of the fluorene-based resin is higher than or equal to 0° C.

Application Example 3

In Application Example 1 or 2, the urethane-based resin and the ester-based resin may be contained in emulsion forms, and average particle sizes of the urethane-based resin and the ester-based resin in the emulsion forms may be greater than or equal to 10 nm and smaller than or equal to 135 nm.

Application Example 4

In any one of Application Examples 1 to 3, the fluorene-based resin may be obtained by a reaction of a polyol component which contains a first diol that contains a fluorene skeleton and a second diol that has a hydrophilic group with a polyisocyanate compound.

Application Example 5

In any one of Application Examples 1 to 4, at least one kind selected from a polyolefin wax, silica particles, a resin having an isoprene skeleton, and an ultraviolet absorber may further be included.

Application Example 6

In Application Example 5, an average particle size of the silica particles may be smaller than or equal to 100 nm.

Application Example 7

In Application Example 5, an average particle size of the ultraviolet absorber may be greater than or equal to 20 nm and smaller than or equal to 100 nm.

Application Example 8

According to another aspect of the invention, there is provided an ink jet recording method including: discharging liquid droplets of the ink jet resin ink composition according to any one of Application Examples 1 to 7 so as to adhere onto a glitter region that contains a glitter pigment formed on a recording medium.

According to the ink jet recording method of Application Example 8, the glitter region having excellent scratch resistance and water resistance may be obtained while maintaining metallic gloss properties.

Application Example 9

According to still another aspect of the invention, there is provided a recorded matter which is obtained by causing the resin ink composition according to any one of Application Examples 1 to 7 to adhere onto a glitter region that contains a glitter pigment formed on a recording medium.

According to the recorded matter of Application Example 9, the glitter region having excellent scratch resistance and water resistance is provided while maintaining metallic gloss properties.

DESCRIPTION OF EXEMPLARY EMBODIMENTS

Hereinafter, exemplary embodiments of the invention will be described. The embodiments in the following description describe examples of the invention. In addition, the invention is not limited by the following embodiments and includes various modification examples executed in a scope that does not change the gist of the invention.

1. Ink Jet Resin Ink Composition

An ink jet resin ink composition according to an embodiment of the invention contains at least one kind of resin selected from a urethane-based resin, an ester-based resin, and a fluorene-based resin.

The ink jet resin ink composition (hereinafter, also simply called a "resin ink composition") according to this embodiment is caused to adhere onto a glitter region (glitter image) that contains a glitter pigment. By causing the resin ink composition to adhere onto the glitter image, the glitter image is coated with the resin ink composition, thereby enhancing the water resistance of the glitter image.

The resin ink composition according to this embodiment is not limited to the adhesion onto the glitter image and may also be caused to adhere onto a region (image) formed by a coloring ink composition (an ink composition that contains a dye or a pigment) on a recording medium or to adhere to a spot where no ink adheres on a recording medium.

The resin ink composition according to this embodiment does not contain a colorant (for example, a pigment, dye, or the like). Therefore, when volatile components contained in the resin ink composition volatilize, a transparent or translucent clear image is formed.

Hereinafter, components contained in the resin ink composition according to this embodiment will be described in detail.

1.1. Resin

The resin ink composition according to this embodiment contains at least one kind of resin selected from a urethane-based resin, an ester-based resin, and a fluorene-based resin. Such resins have a function of enhancing scratch resistance while maintaining metallic gloss properties of glitter images. It is thought that the reason that the metallic gloss properties of the glitter image are able to be maintained when such resins are used is the refractive index when the resins are formed as films, although the details are not found. That is, it is thought that since the refractive index when the resins are formed as films is relatively low (for example, is lower than that of an acryl-based resin or the like in an embodiment described later), the generation of scattered light caused by the resins is suppressed and thus the metallic gloss properties of the glitter image are less likely to be degraded.

The content of the resin is preferably higher than or equal to 0.5 mass % and less than or equal to 5 mass % with respect to the total mass of the resin ink composition in terms of solid content, and more preferably, higher than or equal to 1.0 mass % and less than or equal to 4.0 mass %. Since the content of the resin is in the above range, and particularly, is not lower than the lower limit, the resin is sufficiently formed as films, and thus there may be cases where the scratch resistance of the glitter image is further enhanced. In addition, since the content of the resin is in the above range, and particularly, is not higher than the upper limit, the film formed of the resin is flattened, and thus there may be cases where the metallic gloss properties of the glitter image are further enhanced.

1.1.1. Urethane-Based Resin

The urethane-based resin is a polymer synthesized by the reaction of a polyisocyanate with a polyol. The synthesis of the urethane-based resin may be performed by well-known methods.

Examples of the polyisocyanate include chain aliphatic isocyanates such as tetramethylene diisocyanate, 1,6-hexamethylene diisocyanate, dodecamethylene diisocyanate, trimethyl hexamethylene diisocyanate, and lysine diisocyanate, aliphatic isocyanates having a ring structure such as 1,3-cyclohexylene diisocyanate, 1,4-cyclohexylene diisocyanate, hydrogen-containing xylylene diisocyanate, isophorone diisocyanate, 4,4'-dicyclohexylmethane diisocyanate, and 3,3'-dimethyl-4,4'-dicyclohexylmethane diisocyanate, and aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethylxylylene diisocyanate. In order to synthesize the urethane-based resin, the polyisocyanates may be used singly or in a combination of two or more kinds thereof.

The polyols may include polyether polyols, polycarbonate polyols, and the like.

The polyether polyols may include polyethylene glycol, polypropylene glycol, and polytetramethylene glycol.

Examples of the polycarbonate polyols include diols such as 1,3-propanediol, 1,4-butanediol, 1,6-hexanediol, diethylene glycol, polyethylene glycol, polypropylene glycol, and polytetramethylene glycol, dialkyl carbonates such as phosgene and dimethyl carbonate, and reaction products of cyclic carbonates such as ethylene carbonate.

In order to synthesize the urethane-based resin, the polyols may be used singly or in a combination of two or more kinds thereof.

As the urethane-based resin, a polymer having a glass-transition temperature (Tg) of higher than or equal to −70° C. and less than or equal to 80° C. is preferably used, a polymer having a glass-transition temperature (Tg) of higher than or equal to −20° C. and less than or equal to 80° C. is more preferably used, a polymer having a glass-transition temperature (Tg) of higher than or equal to 0° C. and less than or equal to 70° C. is particularly preferably used. Since the glass-transition temperature of the urethane-based resin is in the above range, and particularly, is not lower than the lower limit, there may be cases where a clear image with low stickiness is formed. In addition, since the glass-transition temperature of the urethane-based resin is in the above range, and particularly, is not higher than the upper limit, a clear image is easily formed as a film, and thus there may be cases where the metallic gloss properties of the glitter image are less likely to be further degraded.

As for the urethane-based resin, a solution type in which the resin is present in a state of being dissolved in a solvent contained in a resin ink, or an emulsion type in which the urethane-based resin is dispersed as particles in a resin ink composition may be used. Particularly, it is preferable that the urethane-based resin be of the emulsion type. The emulsion type urethane resin has a particle form and is thus less likely to permeate into the glitter image than the solution type urethane resin. Therefore, the glitter pigment in the glitter image barely disturbs the arrangement of the urethane-based resin, and thus there may be cases where a glitter image having excellent metallic gloss properties is obtained.

The emulsion type urethane-based resin is obtained by, for example, adding a urethane-based resin in an emulsion state to a resin ink composition using well-known methods.

The emulsion type may be classified into a self-emulsifying type in which a hydrophilic group is introduced to a resin and the resin is dispersed, and a forcibly-emulsifying type in which a resin is dispersed using an emulsifier such as a surfactant. Particularly, it is preferable that the emulsion type urethane-based resin be of the self-emulsifying type in which a hydrophilic group is introduced to the corresponding urethane-based resin. This is because the self-emulsifying emulsion type urethane-based resin has higher water resistance than the forcibly-emulsifying type.

Examples of the self-emulsifying emulsion type urethane-based resin include a urethane resin having a structure of a salt of a carboxyl group (for example, carboxylate salt), a urethane resin having a carboxyl group, a urethane resin having a carbonate skeleton, and a urethane resin having a sulfone group.

In addition, as the self-emulsifying emulsion type urethane-based resin, commercialized products may be used, and examples thereof include SF210 (trade name, produced by Daiichikogyo Co., Ltd.) and WBR-2018 (trade name, produced by Taisei Fine Chemical Co., Ltd.).

In a case where the urethane-based resin is used in the emulsion state, the average particle size of the urethane-based resin is preferably greater than or equal to 10 nm and smaller than or equal to 135 nm, more preferably, greater than or equal to 10 nm and smaller than or equal to 110 nm, and particularly preferably, greater than or equal to 20 nm and smaller than or equal to 80 nm. Since the average particle size of the urethane-based resin is in the above range, and particularly, is not smaller than the lower limit, the urethane-based resin is suppressed from infiltrating into the glitter image or passing through the glitter image to come into contact with the recording medium, and thus there may be cases where the glitter image is more properly coated. In addition, since the average particle size of the urethane-based resin is in the above range, and particularly, is not greater than the upper limit, the film formed of the resin is flattened, and thus the generation of scattered light caused by the resins may be suppressed. Therefore, there may be cases where the metallic gloss properties of the glitter image are less likely to be degraded.

The average particle size of the urethane-based resin may be measured by a particle size distribution measuring apparatus using the dynamic light scattering method as a measurement principle. An example of the particle size distribution measuring apparatus includes "Microtrac UPA" (trade name) produced by Nikkiso Co., Ltd., which employs the heterodyne method as a frequency analysis method. In addition, in the specification, the "average particle size" indicates an average particle size based on volume, unless otherwise noted.

1.1.2. Ester-Based Resin

The ester-based resin is a polymer obtained by the polycondensation of a polyol and a polycarboxylic acid. The ester-based resin may be synthesized by well-known methods.

Examples of the polyol include ethylene glycol, diethylene glycol, 1,3-propanediol, 1,4-butanediol, 1,4-cyclohexanedimethanol, trimethylolpropane, and pentaerythritol. In order to synthesize the ester-based resin, the polyols may be used singly or in a combination of two or more kinds thereof.

As the polycarboxylic acid, specifically, there are oxalic acid, succinic acid, tartaric acid, malic acid, citric acid, phthalic acid, isophthalic acid, terephthalic acid, 2,6-naphthalenedicarboxylic acid, and adipic acid. In order to synthesize the ester-based resin, the polycarboxylic acids may be used singly or in a combination of two or more kinds thereof.

The glass-transition temperature (Tg) of the ester-based resin is preferably higher than or equal to −70° C. and less than or equal to 80° C., more preferably, higher than or equal to −20° C. and less than or equal to 80° C., and particularly preferably, higher than or equal to 0° C. and less than or equal to 70° C. The reason that it is preferable that the glass-transition temperature of the ester-based resin be in the above range is the same as that of the above-described urethane-based resin, and thus description thereof will be omitted.

As for the ester-based resin, a solution type in which the resin is present in a state of being dissolved in a solvent contained in a resin ink, or an emulsion type in which the ester-based resin is dispersed as particles in a resin ink composition may be used. Particularly, it is preferable that the ester-based resin be of the emulsion type. The reason that the emulsion type ester-based resin is preferable is the same as that of the above-described urethane-based resin, and thus description thereof will be omitted.

The emulsion type ester-based resin is obtained by, for example, adding an ester-based resin in an emulsion state to a resin ink composition using well-known methods.

The emulsion type ester-based resin may use any of the self-emulsifying type and the forcibly-emulsifying type. However, for the same reason as the urethane-based resin, the self-emulsifying type is preferable.

Commercialized products may be used as the self-emulsifying emulsion type ester-based resin, and examples thereof include Eastek 1100 and 1300 (trade names, produced by Eastman Chemical Company), and Elitel KZA-1449 and KZA-3556 (trade names, produced by Unitika Ltd.).

In a case where the urethane-based resin is used in the emulsion state, the average particle size of the ester-based resin is preferably greater than or equal to 10 nm and smaller than or equal to 135 nm, more preferably, greater than or equal to 10 nm and smaller than or equal to 110 nm, and particularly preferably, greater than or equal to 20 nm and smaller than or equal to 80 nm. The reason that it is preferable that the average particle size of the ester-based resin be in the above range is the same as that of the above-described urethane-based resin, and thus description thereof will be omitted.

The average particle size of the ester-based resin is able to be measured in the same manner as the urethane-based resin, and thus description thereof will be omitted.

1.1.3. Fluorene-Based Resin

The fluorene-based resin may be obtained by the reaction of a polyol component which contains a first diol that contains a fluorene skeleton and a second diol that has a hydrophilic group with a polyisocyanate component which contains a polyisocyanate compound. The fluorene-based resin is preferably used because the fluorene-based resin enhances light resistance and gas resistance of an image in addition to having a function of enhancing scratch resistance while maintaining the metallic gloss properties of the glitter image described above.

More specifically, examples of the first diol that contains the fluorene skeleton include 9,9-bis(4-(hydroxymethoxy)phenyl)fluorene, 9,9-bis(4-(2-hydroxyethoxy)phenyl)fluorene, 9,9-bis(4-(3-hydroxypropoxy)phenyl)fluorene, 9,9-bis (4-(4-hydroxybutoxy)phenyl)fluorene, 9,9-bis(4-hydroxyphenyl)fluorene, 9,9-bis(4-hydroxytoluoyl)fluorene, and 9,9-bis(4-hydroxyalkyl)fluorene. In addition, as the first diol described above, commercialized products may be used, and examples thereof include Bisphenoxyethanol fluorene, Bisphenol fluorene, and Biscresol fluorene (hereinbefore, trade names, produced by Osaka Gas Chemicals Co., Ltd.).

The first diols that contain the fluorene skeleton may be used singly or in a combination of two or more kinds thereof. Preferably, 9,9-bis(4-(2-hydroxyethoxy)phenyl)fluorene is employed.

In addition, the first diol that contains the fluorene skeleton may be blended at a ratio of, for example, 40 to 60 mass % with respect to the fluorene-based resin. Since the content of the first diol that contains the fluorene skeleton is in the above range, fixability and transparency are excellent.

The second diol may have a hydrophilic group. Examples of the hydrophilic group include a nonionic group such as a polyoxyethylene group and ionic groups such as a carboxyl group, a sulfonyl group, a phosphate group, and a sulfobetaine group.

More specifically, examples of the second diol that has the carboxyl group include dihydroxyl carboxylic acids such as 2,2-dimethylol acetic acid, 2,2-dimethylol lactic acid, 2,2-dimethylol propionic acid (2,2-bis(hydroxymethyl)propionic acid), 2,2-dimethylol butanoic acid, 2,2-dimethylol butyric acid, and 2,2-dimethylol valeric acid, and diamino carboxylic acids such as lysine and arginine.

Examples of the second diol that has the sulfonyl group include N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid, and 2,4-diamino-5-toluenesulfonic acid.

An example of the second diol that has the phosphate group includes 2,3-dihydroxypropyl phenyl phosphate.

In addition, an example of the second diol that has a betain structure-containing group includes a sulfobetaine group-containing compound obtained by the reaction of a tertiary amine such as N-methyldiethanolamine with 1,3-propane sultone.

Moreover, as the second diol, an alkylene oxide-modified product in which an alkylene oxide such as ethylene oxide or propylene oxide is added to the second diol may be employed.

The second diols may be used singly or in a combination of two or more kinds thereof. Preferably, the second diol that has the carboxyl group, for example, 2,2-dimethylol propionic acid is employed.

The first diol that contains the hydrophilic group may be blended at a ratio of, for example, 5 to 15 mass % with respect to the fluorene-based resin. Since the content of the first diol that contains the fluorene skeleton is in the above range, fixability and transparency are excellent.

In addition, the second diol may be blended so that the acid value of the fluorene-based resin is 10 to 130 KOHmg/g, and preferably, 20 to 60 KOHmg/g.

The fluorene-based resin of the invention may contain a polyol compound as necessary. The polyol compound is a compound having two or more hydroxyl groups and may include a low-molecular-weight polyol and a high-molecular-weight polyol.

The polyisocyanate compound is a compound having two or more isocyanate groups, and preferably, a compound having two isocyanate groups, and examples thereof include aliphatic polyisocyanates, alicyclic polyisocyanates, araliphatic polyisocyanates, and aromatic polyisocyanates.

Examples of the aliphatic polyisocyanates include hexamethylene diisocyanate and tetramethylene diisocyanate.

Examples of the alicyclic polyisocyanates include isophorone diisocyanate (3-isocyanatomethyl-3,5,5-trimethylcyclohexyl isocyanate), and 4,4'-, 2,4'-, or 2,2'-dicyclohexylmethane diisocyanate or a mixture thereof.

Examples of the araliphatic polyisocyanates include 1,3- or 1,4-xylylene diisocyanate or a mixture thereof, and 1,3- or 1,4-bis(1-isocyanato-1-methylethyl)benzene or a mixture thereof.

Examples of the aromatic polyisocyanates include 4,4'-, 2,4'- or 2,2'-diphenylmethane diisocyanate or a mixture thereof, 2,4- or 2,6-tolylene diisocyanate or a mixture thereof, 4,4'-toluidine diisocyanate, and 1,5-naphthalene diisocyanate.

As the polyisocyanate compound, there are multimers (for example, a dimmer, a trimer, and the like) of various polyisocyanate compounds described thereof, for example, a biuret-modified product generated by the reaction of various polyisocyanate compounds described above or a multimer thereof with water, an allophanate-modified product generated by the reaction with alcohol or the low-molecular-weight polyol, an oxadiazinetrione-modified product generated by the reaction with carbon dioxide, and moreover, a polyol-modified product generated by the reaction with the low-molecular-weight polyol.

The polyisocyanate compounds may be used singly or in a combination of two or more kinds thereof. Preferably, the alicyclic polyisocyanate, for example, isophorone diisocyanate is employed.

In order to cause the polyol component (that is, the first diol that contains the fluorene skeleton, the second diol that has the hydrophilic group, and the polyol compound as necessary) to react with the polyisocyanate component (that is, the polyisocyanate compound), well-known methods may be used, and for example, they are blended at such a ratio that the equivalent ratio (NCO/hydroxy group) of the isocyanate group of the polyisocyanate component with respect to the droxy group of the polyol component is, for example, 0.4 to 1.0, and preferably, 0.8 to 0.95. Therefore, they may be blended at a ratio of, for example, 30 to 45 mass % with respect to the fluorene-based resin. Since the content of the first diol that contains the fluorene skeleton is in the above range, fixability and transparency are excellent.

The fluorene-based resin may use any form of a water-insoluble resin (emulsion) and a water-soluble resin, and the water-soluble resin form is preferable in use. In addition, the weight-average molecular weight of the fluorene-based resin is preferably in a range of 3000 to 20000, more preferably, 5000 to 15000, and even more preferably 6000 to 12000. Moreover, the Tg (glass-transition temperature) of the fluorene-based resin is preferably higher than or equal to 0° C., more preferably, higher than or equal to 0° C. and less than or equal to 250° C., even more preferably, higher than or equal to 40° C. and less than or equal to 250° C., even further preferably, higher than or equal to 80° C. and less than or equal to 250° C., and particularly preferably higher than or equal to 120° C. and less than or equal to 250° C.

1.2. Other Components

The resin ink composition according to this embodiment may contain a polyolefin wax, silica particles, a resin having an isoprene skeleton, an ultraviolet absorber, and the like.

1.2.1. Polyolefin Wax

One of the functions of the polyolefin wax is increasing the slidability of a clear image. Accordingly, the scratch resistance of a glitter image formed under the clear image may further be enhanced.

The polyolefin wax is not particularly limited, and examples thereof include olefins such as ethylene, propylene, and butylene or a wax produced from the derivatives thereof and a copolymer thereof, and specifically, include a polyethylene-based wax, a polypropylene-based wax, a polybutylene-based wax, and a paraffin-based wax. The polyolefin waxes may be used singly or in a combination of two or more kinds thereof.

As the polyolefin waxes, commercialized products may be used, and examples thereof include Chemipearl series such as Chemipearl W4005 (polyethylene-based) produced by Mitsui Chemicals, Inc., AQUACER series such as AQUACER 513, 515, 531, 552, and 840 (hereinbefore, all are polyethylene-based) and 498, 537, and 539 (hereinbefore, all are paraffin-based) produced by BYK-Chemie Japan K.K., Hitech series such as Hitech E-7025P, Hitech E-2213, Hitech E-9460, Hitech E-9015, Hitech E-4A, Hitech E-5403P, Hitech E-8237 (hereinbefore, produced by TOHO Chemical Industry Co., Ltd.), and Nopcoat PEM-17 (produced by San Nopco Limited, polyethylene emulsion, a particle size of 40 nm). These are commercialized in the form of a water-based emulsion in which a polyolefin wax is dispersed in water by ordinary methods. The resin ink composition according to this embodiment may be directly added while being in the water-based emulsion form.

In a case where the polyolefin wax is contained, the content thereof is preferably higher than or equal to 0.05 mass % and less than or equal to 2 mass % with respect to the total mass of the resin ink composition in terms of solid content, and more preferably, higher than or equal to 0.1 mass % and less than or equal to 1 mass %. When the content of the polyolefin wax is in the above range, there may be cases where the scratch resistance of the glitter image is further enhanced while the metallic gloss properties of the glitter image are maintained.

1.2.2. Silica Particles

Silica ($SiO_2$) particles have a high ultraviolet absorption coefficient and excellent barrier properties against gases such as ozone. Therefore, when silica particles are contained in the resin ink composition according to this embodiment, the light resistance and gas resistance of the glitter image may be enhanced.

It is preferable that the silica particles be added as a colloid solution (colloidal silica) in which the silica particles are dispersed in water or an organic solvent. Accordingly, the silica particles are able to be easily dispersed in the resin ink composition. As such colloidal silica, commercialized products may be used, and examples thereof include Snowtex series such as Snowtex XS, OXS, NXS, and CXS-9 produced by Nissan Chemical Industries, Ltd.

The average particle size of the silica particles is preferably smaller than or equal to 100 nm, more preferably, greater than or equal to 2 nm and smaller than or equal to 50 nm, and particularly preferably, greater than or equal to 4 nm and smaller than or equal to 30 nm. Since the average particle size of the silica particles is in the above range, and particularly, is not greater than the upper limit, the flatness of the clear image is less likely to be deteriorated, and thus the light resistance and gas resistance of the glitter image may be enhanced while maintaining the metallic gloss properties of the glitter image.

The average particle size of the silica particles may be measured after the silica particles are disposed in a solvent or the like in the same manner as that of the urethane-based resin described above, and thus description thereof will be omitted.

In a case where the silica particles are contained, the content thereof is preferably higher than or equal to 0.1 mass % and less than or equal to 5 mass % with respect to the total mass of the resin ink composition, and more preferably, higher than or equal to 0.5 mass % and less than or equal to 2 mass %. When the content of the silica particles is in the above range, the light resistance and gas resistance of the glitter image may be sufficiently enhanced.

1.2.3. Resin having Isoprene Skeleton

The resin having an isoprene skeleton is able to suppress the degradation of metallic gloss properties caused by a sulfur compound contained in the recording medium, specifically, a thioether-based compound (for example, 3-thia-1,5-pentanediol and 4-thia-1,7-heptanediol) added for the purpose of enhancing the whiteness index or glossiness of the recording medium or enhancing the gas resistance and light resistance of a printed material which uses a coloring material such as a dye or a pigment. The reason is as follows. When the thioether-based compound is contained in the recording medium, there may be causes where a minute amount of the thioether-based compound dissolves in an ink solvent when the glitter image and the clear image are recorded and as a result, the sulfur compound is precipitated on the surface of the clear image. The precipitated sulfur compound scatters light and thus there may be cases where the metallic gloss properties of the glitter image are degraded. In this case, when the resin having the isoprene skeleton is contained in the resin ink composition, the resin having the isoprene skeleton is able to trap the sulfur compound, thereby suppressing the degradation in the metallic gloss properties of the glitter image.

In addition, the resin having the isoprene skeleton has a function of enhancing gas resistance.

The resin having the isoprene skeleton has an isoprene group as a unit skeleton, and more preferably, has an isoprenesulfonic acid skeleton.

Commercialized products may be used as the resin having the isoprene skeleton, and examples thereof include DK201, DK202A, and DK106 (hereinbefore, trade names, produced by JSR Corporation).

In a case where the resin having the isoprene skeleton is contained, the content thereof is preferably higher than or equal to 0.1 mass % and less than or equal to 5 mass % with respect to the total mass of the resin ink composition, and more preferably, higher than or equal to 0.5 mass % and less than or equal to 2 mass %. When the content of the resin having the isoprene skeleton is in the above range, the gas resistance of the glitter image may be sufficiently enhanced.

1.2.4. Ultraviolet Absorber

The ultraviolet absorber has a function of absorbing light such as ultraviolet rays and converting the light into vibrational energy or thermal energy. Accordingly, the light resistance of the glitter image may be enhanced.

As the ultraviolet absorber, there are an organic ultraviolet absorber (for example, a triazine-based compound, a benzotriazole-based compound, and a benzophenone-based compound) and an inorganic ultraviolet absorber (for example, cerium oxide particles, zirconium oxide particles, iron oxide particles, titanium oxide particles, and zinc oxide particles). The ultraviolet absorbers may be used singly or in a combination of two or more kinds thereof.

From the ultraviolet absorbers, the organic ultraviolet absorber is preferably used because of excellent transparency.

In addition, from the organic ultraviolet absorbers, the triazine-based compound and the benzotriazole-based compound are preferably used. This is because the triazine-based compound and the benzotriazole-based compound easily absorb light at a wavelength that causes discoloration and color fading.

Examples of the triazine-based compound include 2-[2-hydroxy-4-(1-octyloxycarbonylethoxy)phenyl]-4,6-bis(4-phenylphenyl)-1,3,5-triazine, a reaction product of 2-(2,4-dihydroxyphenyl)-4,6-bis-(2,4-dimethylphenyl)-1,3,5- triazine and (2-ethylhexyl)-glycidic ester, and 2,4-bis(2-hydroxy-4-butoxyphenyl)-6-(2,4-dibutoxyphenyl)-1,3,5-triazine.

In addition, commercialized products may be used as the triazine-based compound, and examples thereof include TINUVIN 400, 405, 460, 477-DW, and 479 (trade names, produced by Ciba Japan K.K.), and KEMISORB 102L (trade name, produced by Chemipro Kasei Kaisha Ltd.).

As the benzotriazole-based compound, there are 2-(2-hydroxy-5-t-butylphenyl)-2H-benzotriazole, 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)phenol, 2-(5-methyl-2-hydroxyphenyl)benzotriazole, 2-(3,5-di-t-butyl-2-hydroxyphenyl)-5-chlorobenzotriazole, 2-(3-t-butyl-5-methyl-2-hydroxyphenyl)-5-chlorobenzotriazole, 2-(3,5-di-t-amyl-2-hydroxyphenyl)benzotriazole, 2-(3,5-di-t-butyl-2-hydroxyphenyl)benzotriazole, 2-(5-di-t-octyl-2-hydroxyphenyl)benzotriazole, and methacrylate 2-[3-(2H-benzotriazole-2-yl)-4-hydroxyphenyl]ethyl.

Commercialized products may be used as the benzotriazole-based compound, and examples thereof include TINUVIN PS, 99-2, 109, 384-2, 900, 928, and 1130 (trade names, produced by Ciba Japan K.K.), KEMISORB 12, 71, 72, 73, 74, 75, and 79 (trade names, Chemipro Kasei Kaisha Ltd.), SEESORB 701, 703, 704, 705, 706, and 709 (trade names, Shipro Kasei Kaisha, Ltd.), and RUVA93 (trade name, Otsuka Chemical Co., Ltd.).

The average particle size of the ultraviolet absorber is preferably greater than or equal to 20 nm and smaller than or equal to 100 nm, and more preferably, greater than or equal to 50 nm and smaller than or equal to 100 nm. Since the average particle size of the ultraviolet absorber is in the above range, and particularly, is not greater than the upper limit, the flatness of the clear image is less likely to be deteriorated, and thus the light resistance and gas resistance of the glitter image may be enhanced while maintaining the metallic gloss properties of the glitter image.

The particle size of the ultraviolet absorber may be measured after the ultraviolet absorber is disposed in a solvent or the like in the same manner as that of the urethane-based resin described above, and thus description thereof will be omitted.

In a case where the ultraviolet absorber is contained, the content thereof is preferably higher than or equal to 0.1 mass % and less than or equal to 5 mass % with respect to the total mass of the resin ink composition, and more preferably, higher than or equal to 0.5 mass % and less than or equal to 2 mass %. When the content of the silica particles is in the above range, the light resistance of the glitter image may be sufficiently enhanced.

1.2.5. Other Components

The resin ink composition according to this embodiment may further contain water, a water-soluble organic solvent, a surfactant, a pH adjuster, a preservative/fungicide, a rust-proofing agent, and a chelating agent. When the resin ink composition contains such compounds, there may be cases where the characteristics thereof are further enhanced.

Water

As the water, pure water such as ion-exchange water, ultrafiltration water, reverse osmosis water, and distilled water or ultrapure water is preferably used. Particularly, water subjected to a sterilization process such as ultraviolet irradiation or hydrogen peroxide addition is preferable because the generation of mold or bacteria is prevented for a long period of time.

Water-Soluble Organic Solvent

Examples of the water-soluble organic solvent include polyhydric alcohols and pyrrolidone derivatives. The water-soluble organic solvents may be used singly or in a combination of two or more kinds thereof.

As the polyhydric alcohols, there are ethylene glycol, diethylene glycol, triethylene glycol, polyethylene glycol, polypropylene glycol, dipropylene glycol, propylene glycol, butylene glycol, 1,2-butanediol, 1,2-pentanediol, 1,5-pentanediol, 1,2-hexanediol, 2-ethyl-1,3-hexanediol, 1,6-hexanediol, 1,2-heptanediol, 1,2-octanediol, 1,2,6-hexanetriol, thioglycol, hexylene glycol, glycerin, trimethylolethane, and trimethylolpropane. Such polyhydric alcohols have an effect of reducing clogging of nozzle holes in a case where the resin ink composition is discharged from the nozzle holes of an ink jet recording apparatus.

Examples of the pyrrolidone derivatives include N-methyl-2-pyrrolidone, N-ethyl-2-pyrrolidone, N-vinyl-2-pyrrolidone, 2-pyrrolidone, and 5-methyl-2-pyrrolidone.

Surfactant

The surfactant appropriately maintains the surface tension of the resin ink composition and the interfacial tension with a printer member such as nozzles that come in contact with the resin ink composition. Therefore, when the surfactant is used in the ink jet recording apparatus, discharge stability may be enhanced. In addition, the surfactant has an effect of being uniformly wet and spreading on the recording medium.

A nonionic surfactant is preferable as the surfactant having such an effect. From the nonionic surfactants, at least one of a silicone-based surfactant and an acetylene glycol-based surfactant is more preferably used.

A polysiloxane-based compound is preferably used as the silicone-based surfactant, and a polyether-modified organosiloxane or the like may be employed. More specifically, there are BYK-306, BYK-307, BYK-333, BYK-341, BYK-345, BYK-346, and BYK-348 (hereinbefore, trade names, produced by BYK-Chemie Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (hereinbefore, trade names, produced by Shin-Etsu Chemical Co., Ltd.).

Examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (hereinbefore, all are trade names, produced by Air Products and Chemicals, Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (hereinbefore, all are trade names, produced by Nissin Chemical Industry Co., Ltd.), Acetylenol E00, E00P, E40, and E100 (hereinbefore, all are trade names, produced by Kawaken Fine Chemicals Co., Ltd.).

In addition, an anion surfactant, a nonionic surfactant, an amphoteric surfactant, and the like may further be added as a surfactant other than the above surfactants.

pH Adjuster

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Preservative/Fungicide

Examples of the preservative/fungicide include sodium benzoate, sodium pentachlorophenol, 2-pyridinethiol-1-oxide sodium, sodium sorbate, sodium dehydroacetate, and 1,2- dibenzisothiazoline-3-one. As commercialized products, there are Proxel XL2 and Proxel GXL (hereinbefore, trade names, produced by Avecia Inc.) and Denicide CSA and NS-500W (hereinbefore, trade names, produced by Nagase ChemteX Corporation).

Rust-Proofing Agent

An example of the rust-proofing agent includes benzotriazole.

Chelating Agent

Examples of the chelating agent include ethylenediamine tetraacetic acid and salts thereof (ethylenediamine tetraacetic acid disodium dihydrate).

1.3. Preparation of Resin Ink Composition

The resin ink composition according to this embodiment may be produced by dispersing and mixing the above components in an appropriate manner. After the above components are sufficiently agitated, filtration is performed thereon to remove coarse particles and foreign matter which are the cause of clogging, thereby obtaining a desired resin ink composition.

1.4. Physical Properties of Resin Ink Composition

In a case where the resin ink composition is discharged from the nozzle holes of the ink jet recording apparatus, the viscosity of the resin ink composition at 20° C. is preferably higher than or equal to 2 mPa·s and less than or equal to 10 mPa·s, and more preferably, higher than or equal to 3 mPa·s and less than or equal to 6 mPa·s. When the viscosity at 20° C. is in the above range, an appropriate amount of the resin ink composition is discharged from the nozzle holes. Therefore, the resin ink composition is further suppressed from forming a flying curve and scattering and thus is able to be appropriately used in the ink jet recording apparatus. The viscosity of the resin ink composition may be measured by maintaining the temperature of the resin ink composition at 20° C. using an oscillation viscometer VM-100AL (produced by Yamaichi Electronics Co., Ltd.).

2. Glitter Ink Composition

The resin ink composition according to this embodiment is caused to adhere onto a glitter region (glitter image) including a glitter pigment. The glitter region is not particularly limited as long as the glitter region is formed of the glitter pigment, and for example, is formed using a glitter ink composition that contains the glitter pigment. Hereinafter, the components contained in the glitter ink composition will be described.

2.1. Glitter Pigment

The glitter pigment is not particularly limited as long as the glitter pigment exhibits glitter properties (metallic gloss properties) when it adheres to a medium, and examples thereof include an alloy made of one kind or two or more kinds selected from the group consisting of aluminum, silver, gold, platinum, nickel, chromium, tin, zinc, indium, titanium, and copper, and a pearl pigment having pearl gloss. A representative example of the pearl pigment includes a pigment having pearl gloss or interference gloss such as mica coated with titanium dioxide, scale foil, or bismuth acid chloride. In addition, the glitter pigment may be subjected to a surface treatment for suppressing a reaction with water. Particularly, as the glitter pigment, silver or aluminum is more preferably used. Silver or aluminum is a metal having high whiteness from among various metals and thus is able to express various metallic colors such as gold color or copper color by overlapping other colors of ink.

In the invention, the metallic gloss properties refer to a luster sensation unique to metal, a gloss sensation, and the like, and for example, include matte metallic gloss.

The content of the glitter pigment is preferably higher than or equal to 1 mass % and less than or equal to 20 mass % with respect to the total mass of the glitter ink composition, and preferably, higher than or equal to 1 mass % and less than or equal to 15 mass %. When the content of the glitter pigment is in the above range, an image having excellent metallic gloss properties may be formed.

2.2. Other Components

The glitter ink composition may contain components exemplified in "1.2.5. Other Components" such as the water-soluble organic solvent.

In addition, the main solvent (a solvent which is contained at, for example, 50 mass % or higher with respect to the total mass of the glitter ink composition) of the glitter ink composition may be water or an organic solvent (for example, alcohols, ketones, carboxylic acid esters, and ethers).

3. Ink Jet Recording Method

An ink jet recording method according to the embodiment of the invention includes a process of discharging liquid droplets of the ink jet resin ink composition described above to adhere to the glitter region that contains the glitter pigment formed on the recording medium.

A method of discharging the resin ink composition as liquid droplets may be performed using, for example, the following ink jet recording methods. Specifically, there are a method of applying an intense electric field between nozzles and accelerating electrodes placed in front of the nozzles, continuously discharging liquid droplets of ink from the nozzles, and applying a printing information signal to deflection electrodes while the liquid droplets of the ink fly between the deflection electrodes for recording or a method (electrostatic attraction method) of discharging the liquid droplets to correspond to the printing information signal without deflecting the liquid droplets of the ink, a method of applying a pressure to an ink liquid using a small pump to mechanically oscillate nozzles by crystal oscillators and the like, thereby forcibly discharging liquid droplets of ink, a method (piezoelectric method) of discharging liquid droplets of ink for recording by simultaneously applying a pressure and a printing information signal to the ink using piezoelectric elements, a method (thermal jet method) of discharging liquid droplets for recording by heating and foaming ink using minute electrodes according to a printing information signal, and the like.

Hereinafter, the ink jet recording method according to this embodiment will be described by exemplifying a case where an ink jet printer is used. In addition, the invention is not limited by the following embodiments.

First, liquid droplets of the glitter ink composition are discharged from the nozzles of the recording head of the ink jet printer so as to cause the liquid droplets of the glitter ink composition to adhere onto the recording medium. Accordingly, the glitter region (glitter image) is formed on the recording medium. In addition, the glitter region is not limited by being formed by the ink jet recording method, and may also be formed by a method of applying the glitter ink composition using a roll coater or the like. In addition, in a case where a recording medium in which a glitter region is formed in advance is used, this process may be omitted.

Next, liquid droplets of the resin ink composition are discharged from the nozzles to adhere onto the glitter region that contains the glitter pigment formed on the recording medium. In this manner, a recorded matter in which a clear image made of the resin ink composition is formed on the glitter region is obtained.

The glitter region is coated with the clear image made of the resin ink composition described above and thus has excellent water resistance and scratch resistance while maintaining metallic gloss properties.

The film thickness of the clear image formed on the glitter region is preferably greater than or equal to 0.1 μm and smaller than or equal to 0.2 μm. When the film thickness of the clear image is in the above range, there may be cases where the metallic gloss properties, scratch resistance, and water resistance of the glitter region are further enhanced.

The ink jet recording method according to this embodiment may further include, after the process of causing the resin ink composition to adhere to the glitter region, a process of causing a coloring ink composition that contains a colorant (for example, a dye or a pigment) to adhere onto the resin ink composition. Accordingly, an image which also has metallic gloss properties while having a hue caused by the colorant is obtained. Formation of the image using the coloring ink composition may be performed using the ink jet recording method.

As described above, when a layer (clear image) made of a resin ink is formed between the layer made of the coloring ink composition and the glitter region (glitter image), the degradation in the metallic gloss properties of the glitter region caused by the components contained in the coloring ink composition may be suppressed.

According to this embodiment, any medium may be used as the recording medium used in the ink jet recording method as desired, and examples thereof include, as well as paper such as common paper and dedicated paper having an ink accommodation layer or the like, a base material in which a region that contains a surface to which ink is applied is made of various plastics, ceramic, glass, metal, or a composite thereof.

4. Examples

Hereinafter, the invention is described in more detail by Examples and Comparative Examples, and the invention is not limited to the Examples.

4.1. Preparation of Resin Ink Composition

Components shown in Table 1 were mixed and agitated, thereby preparing resin ink compositions CL1 to CL19. The components shown in Table 1 are as follows. In addition, the contents of resins and adjuvants shown in Table 1 are values converted into solid components.

Resin

Urethane 1 (a urethane-based resin emulsion having a carboxylate salt structure, with a Tg of 30° C. and an average particle size of 25 nm)

Urethane 2 (a urethane-based resin emulsion having a carboxyl group, with a Tg of 50° C. and an average particle size of 50 nm)

Urethane 3 (a urethane-based resin emulsion having a carbonate skeleton, with a Tg of −70° C. and an average particle size of 135 nm)

Polyester 1 (trade name "Eastek 1100", produced by Eastman Chemical Company, an ester-based resin emulsion with a Tg of 55° C. and an average particle size of 11 nm)

Polyester 2 (trade name "Eastek 1300", produced by Eastman Chemical Company, an ester-based resin emulsion with a Tg of 36° C. and an average particle size of 26 nm)

Fluorene (a water-soluble resin with a Tg of higher than or equal to 150° C. and a weight-average molecular weight of 8600)

Styrene acryl (a styrene acryl-based resin emulsion with an average particle size of 40 nm)

Acryl (trade name "Mowinyl 6530" produced by The Nippon Synthetic Chemical Industry Co., Ltd., an acryl-based resin emulsion, with a Tg of 30° C. and a particle size of 100 nm)

Other Components

Paraffin wax (trade name "AQUACER 539", produced by BYK-Chemie Japan K.K., a paraffin-based wax emulsion with an average particle size of 54 nm)

Silica (trade name "Snowtex XS", produced by Nissan Chemical Industries, Ltd., colloidal silica with an average particle size of 4 nm to 6 nm)

Isoprene (trade name "DK201", produced by JSR Corporation, a water-soluble resin having an isoprenesulfonic acid skeleton)

UV absorber 1 (a benzotriazole-based ultraviolet absorber with a particle size of 81 nm)

UV absorber 2 (a triazine-based ultraviolet absorber with a particle size of 90 nm)

1,2-hexanediol

Olfine E1010 (trade name, produced by Nissin Chemical Industry Co., Ltd., a acetylene glycol-based surfactant)

Trimethylolpropane

Triethanolamine

Water

TABLE 1

| Composition of resin ink | | CL1 | CL2 | CL3 | CL4 | CL5 | CL6 | CL7 | CL8 | CL9 | CL10 |
|---|---|---|---|---|---|---|---|---|---|---|---|
| Resin | Urethane 1 | 1 | | | | | | 1 | 1 | 1 | 1 |
| | Urethane 2 | | 1 | | | | | | | | |
| | Urethane 3 | | | 1 | | | | | | | |
| | Polyester 1 | | | | 1 | | | | | | |
| | Polyester 2 | | | | | 1 | | | | | |
| | Fluorene | | | | | | 1 | | | | |
| | Styrene acryl | | | | | | | | | | |
| | Acryl | | | | | | | | | | |
| Others | Paraffin wax | | | | | | | | 0.1 | | |
| | Silica particles | | | | | | | | | 1 | |
| | Isoprene | | | | | | | | | | 1 |
| | UV absorber 1 | | | | | | | | | | 1 |
| | UV absorber 2 | | | | | | | | | | |
| | 1,2-hexanediol | 8 | 8 | 8 | 8 | 8 | 8 | 8 | 8 | 8 | 8 |
| | Olfine E1010 | 0.5 | 0.5 | 0.5 | 0.5 | 0.5 | 0.5 | 0.5 | 0.5 | 0.5 | 0.5 |
| | Trimethylolpropane | 17 | 17 | 17 | 17 | 17 | 17 | 17 | 17 | 17 | 17 |
| | Triethanolamine | 0.1 | 0.1 | 0.1 | 0.1 | 0.1 | 0.1 | 0.1 | 0.1 | 0.1 | 0.1 |
| | Water | Balance | Balance | Balance | Balance | Balance | Balance | Balance | Balance | Balance | Balance |
| Total (mass %) | | 100 | 100 | 100 | 100 | 100 | 100 | 100 | 100 | 100 | 100 |

TABLE 1-continued

| Composition of resin ink | | CL11 | CL12 | CL13 | CL14 | CL15 | CL16 | CL17 | CL18 | CL19 |
|---|---|---|---|---|---|---|---|---|---|---|
| Resin | Urethane 1 | 1 | 1 | 1 | 0.5 | 3 | 5 | | | |
| | Urethane 2 | | | | | | | | | |
| | Urethane 3 | | | | | | | | | |
| | Polyester 1 | | | | | | | | | |
| | Polyester 2 | | | | | | | | | |
| | Fluorene | | 0.4 | 0.4 | | | | | | |
| | Styrene acryl | | | | | | | 1 | | |
| | Acryl | | | | | | | | 1 | |
| Others | Paraffin wax | | | 0.1 | | | | | | 1 |
| | Silica particles | | | | | | | | | |
| | Isoprene | | | | | | | | | |
| | UV absorber 1 | | | | | | | | | |
| | UV absorber 2 | 1 | | | | | | | | |
| | 1,2-hexanediol | 8 | 8 | 8 | 8 | 8 | 8 | 8 | 8 | 8 |
| | Olfine E1010 | 0.5 | 0.5 | 0.5 | 0.5 | 0.5 | 0.5 | 0.5 | 0.5 | 0.5 |
| | Trimethylolpropane | 17 | 17 | 17 | 17 | 17 | 17 | 17 | 17 | 17 |
| | Triethanolamine | 0.1 | 0.1 | 0.1 | 0.1 | 0.1 | 0.1 | 0.1 | 0.1 | 0.1 |
| | Water | Balance | Balance | Balance | Balance | Balance | Balance | Balance | Balance | Balance |
| Total (mass %) | | 100 | 100 | 100 | 100 | 100 | 100 | 100 | 100 | 100 |

4.2. Preparation of Glitter Ink Composition

4.2.1. Preparation of Silver Ink

First, polyvinylpyrrolidone (PVP, with a weight-average molecular weight of 10000) was heated under a condition of 70° C. for 15 hours and thereafter was cooled at room temperature. 1000 g of the PVP was added to 500 ml of an ethylene glycol solution so as to be adjusted to a PVP solution. 500 ml of ethylene glycol was put into another container and 128 g of silver nitrate was added thereto, and the resultant was sufficiently agitated by an electromagnetic agitator so as to be adjusted to a silver nitrate solution. While the PVP solution was agitated using an overhead mixer under a condition of 120° C., the silver nitrate solution was added thereto, and the resultant was heated for about 80 minutes for reactions. Thereafter, the resultant was cooled at room temperature. The obtained solution was subjected to centrifugation by a centrifuge under a condition of 2200 rpm for 10 minutes. Thereafter, separated silver colloid is taken out, and was added to 500 ml of an ethanol solution in order to remove residual PVP. In addition, centrifugation was further performed to take out silver colloid. Moreover, the taken-out silver colloid was dried under conditions of 35° C. and 1.3 Pa by a vacuum dryer.

Using 8 mass % of silver colloid produced as described above, silver ink compositions were prepared from material compositions shown in Table 2.

4.2.2. Preparation of Aluminum Ink Composition

First, a PET film having a film thickness of 100 μm was uniformly coated with a resin layer coating liquid which includes 3.0 mass % of a cellulose ester resin and 97 mass % of diethylene glycol diethyl ether by a bar coating method, and was dried at 60° C. for 10 minutes, thereby forming a resin layer thin film on the PET film.

Next, using a vacuum deposition apparatus (VE-1010 type vacuum deposition apparatus produced by Vacuum Device Inc.), an aluminum deposition layer having an average film thickness of 20 nm was formed on the resin layer.

In addition, the laminate formed in the method described above was immersed into diethylene glycol diethyl ether, and using an ultrasonic disperser ("VS-150" produced by AS ONE Corporation), peeling, size reduction, and a dispersion treatment are simultaneously performed, thereby producing a metallic pigment dispersion liquid having an integrated time subjected to the ultrasonic dispersion treatment of 12 hours.

The obtained metallic pigment dispersion liquid was subjected to a filtration treatment by a SUS mesh filter having a mesh size of 5 μm to remove coarse particles. Next, the filtrate was input to a round-bottom flask and diethylene glycol diethyl ether was distilled using a rotary evaporator. In this manner, a scale-like aluminum pigment was obtained.

The obtained scale-like aluminum pigment was dispersed in the diethylene glycol diethyl ether, thereby obtaining an aluminum ink composition.

Among components used in Table 2, the components that are not shown in Table 1 are as follows.
Glitter Pigment
  Silver colloid (see "4.2.1" above)
  Aluminum pigment (a scale-like aluminum pigment, see "4.2.2." above)
Other Components
  1,6-hexanediol
  PVP K15 (trade name, produced by Tokyo Chemical Industry Co., Ltd., polyvinylpyrrolidone)
  diethylene glycol diethyl ether

TABLE 2

| Composition of glitter ink composition | | Silver ink | Aluminum ink |
|---|---|---|---|
| Glitter pigment | Silver colloid | 8 | |
| | Aluminum pigment | | 1.5 |
| Others | 1,6-hexanediol | 3 | |
| | Olfine E1010 | 0.5 | |
| | Trimethylolpropane | 4 | |
| | Triethanolamine | 0.3 | |
| | PVP K15 | 5 | |
| | Water | Balance | |
| | Diethylene glycol diethyl ether | | Balance |
| Total (mass %) | | 100 | 100 |

4.3. Evaluation Tests

In the following evaluation tests, a cartridge which was filled with the resin ink compositions and the glitter ink compositions shown in Tables 1 and 2 was mounted in an ink jet printer PX-G930 (trade name, produced by Seiko Epson Corporation) was used.

4.3.1. Production of Evaluation Samples

1. Example 1

The evaluation samples of Example 1 were produced as follows. First, liquid droplets of the silver ink were discharged from the nozzle holes of the printer, thereby forming a glitter region (glitter image) on a recording medium (trade name "Glossy Photo Paper" produced by Seiko Epson Corporation).

Next, the resin ink composition CL1 was discharged from the nozzle holes of the printer to adhere onto the glitter region, thereby forming a clear image that coats the glitter region. In this manner, the evaluation samples of Example 1 were obtained.

In addition, the recording conditions of both the glitter image and the clear image were an image resolution of 1440 dpi×1440 dpi and a Duty of 40%.

In the specification, a "Duty value" is a value calculated by the following expression.

Duty (%)=the number of actual discharged dots/(vertical resolution×horizontal resolution)×100

(where "the number of actual discharged dots" is the number of actual discharged dots per unit area, and the "vertical resolution" and "horizontal resolution" are resolutions per unit area.)

2. Examples 2 to 16

Evaluation samples of Examples 2 to 16 were obtained in the same manner as the production of the evaluation samples of Example 1 except that the resin ink compositions CL2 to CL16 were respectively used instead of the resin ink composition CL1.

3. Example 17

Evaluation samples of Example 17 were obtained in the same manner as the production of the evaluation samples of Example 1 except that the resin ink composition CL7 was used instead of the resin ink composition CL1 and aluminum ink was used instead of silver ink.

4. Comparative Examples 1 to 3

Evaluation samples of Comparative Examples 1 to 3 were obtained in the same manner as the production of the evaluation samples of Example 1 except that the resin ink compositions CL17 to CL19 were respectively used instead of the resin ink composition CL1.

5. Comparative Example 4

Evaluation samples of Comparative Example 4 were obtained in the same manner as the production of the evaluation samples of Example 1 except that the resin ink compositions were not used.

6. Comparative Example 5

Evaluation samples of Comparative Example 5 were obtained in the same manner as the production of the evaluation samples of Example 1 except that aluminum ink was used instead of silver ink and the resin ink compositions were not used.

4.3.2. Evaluation Tests

1. Metallic Gloss Properties

The 60-degree specular glossiness of the glitter region of the obtained evaluation sample was measured using a gloss meter (produced by Nippon Denshoku Industries Co., Ltd., trade name "GlossMeter product No. VGP5000") according to JIS Z8741:1997. Evaluation of the metallic gloss properties of the glitter region was performed on the basis of the obtained 60-degree specular glossiness. Classification of the evaluation standard is as follows.
A: the 60-degree specular glossiness is higher than or equal to 325
B: the 60-degree specular glossiness is higher than or equal to 290 and lower than 325
C: the 60-degree specular glossiness is lower than 290

2. Scratch Resistance

Using the color fastness rubbing tester AB-301 (produced by Tester Sangyo Co., Ltd.), under conditions of a friction count of 50 times with no load, a friction element equipped with white cotton fabric for friction (Kanakin No. 3) and the glitter region were rubbed against each other, and the surface state of the glitter region was visually observed. In addition, the evaluation standard is as follows.
A: no flaws are admitted in the glitter region
B: small flaw are admitted in the glitter region
C: flaws are clearly admitted in the glitter region
D: flaws are clearly admitted in the glitter region and peeling is admitted in a part of the glitter region 3. Water Resistance The glitter region of the obtained evaluation sample was wiped 10 times by the Bemcot (trade name, produced by Asahi Kasei Fibers Corporation) immersed into water, and the glitter region and the Bemcot were visually observed. The evaluation standard is as follows.
A: there is no change in the outer appearance of the glitter region, and no adhering material is admitted in the Bemcot
B: although slight unevenness is admitted in the glitter region, no adhering material is admitted in the Bemcot
C: apparent unevenness is admitted in the glitter region, and an adhering material is admitted in the Bemcot 4. Gas Resistance Evaluation of gas resistance of the obtained evaluation sample was performed. Specifically, the evaluation sample was installed in the ozone weather meter OMS-L type (trade name, produced by Suga Test Instruments Co., Ltd.), and an ozone exposure test was performed under conditions of a temperature of 23° C., a humidity of 50% RH, and an ozone concentration of 5 ppm for 16 hours. Thereafter, in the same method as the evaluation method of the metallic gloss properties, the 60-degree specular glossiness of the glitter region was measured, and comparison with the 60-degree specular glossiness before the gas resistance test was performed. In addition, the evaluation standard is as follows.
A: a reduction in the 60-degree specular glossiness is less than 3%
B: a reduction in the 60-degree specular glossiness is higher than or equal to 3% and less than 7%
C: a reduction in the 60-degree specular glossiness is higher than or equal to 7% and less than 15%
D: a reduction in the 60-degree specular glossiness is higher than or equal to 15%

5. Light Resistance

Evaluation of the light resistance of the glitter region of the obtained evaluation sample was performed. Specifically, on the basis of "Digital Color Photo Print Stability Evaluation" (JEITA CP-3901) issued by Japan Electronics and Information Technology Industries Association (JEITA), an acceleration test that reproduces image deterioration corresponding to 20 years was performed. Thereafter, in the same method as the evaluation method of the metallic gloss properties described above, the 60-degree specular glossiness of the glitter region was measured, and comparison with the 60-degree specular glossiness before the light resistance test was performed. In addition, the evaluation standard is as follows.
A: a reduction in the 60-degree specular glossiness is less than 7%
B: a reduction in the 60-degree specular glossiness is higher than or equal to 7% and less than 15%
C: a reduction in the 60-degree specular glossiness is higher than or equal to 15%

4.4. Evaluation Results

The evaluation results are shown in Tables 3 to 5.

TABLE 3

|  |  | Example 1 | Example 2 | Example 3 | Example 4 | Example 5 | Example 6 | Example 7 | Example 8 | Example 9 |
|---|---|---|---|---|---|---|---|---|---|---|
| Ink used | Glitter ink composition | Silver ink | Silver ink | Silver ink | Silver ink | Silver ink | Silver ink | Silver ink | Silver ink | Silver ink |
|  | Resin ink composition | CL1 | CL2 | CL3 | CL4 | CL5 | CL6 | CL7 | CL8 | CL9 |
| Evaluation results | Metallic gloss properties | A | A | B | B | B | B | A | A | A |
|  | Scratch resistance | B | B | B | B | A | B | A | B | B |
|  | Water resistance | A | A | B | A | A | A | A | A | B |
|  | Gas resistance | C | B | C | A | B | A | C | A | A |
|  | Light resistance | B | B | B | B | B | A | B | A | B |

TABLE 4

|  |  | Example 10 | Example 11 | Example 12 | Example 13 | Example 14 | Example 15 | Example 16 | Example 17 |
|---|---|---|---|---|---|---|---|---|---|
| Ink used | Glitter ink composition | Silver ink | Silver ink | Silver ink | Silver ink | Silver ink | Silver ink | Silver ink | Aluminum ink |
|  | Resin ink composition | CL10 | CL11 | CL12 | CL13 | CL14 | CL15 | CL16 | CL7 |
| Evaluation results | Metallic gloss properties | B | B | A | A | A | B | B | A |
|  | Scratch resistance | B | B | B | A | B | B | A | A |
|  | Water resistance | B | A | A | A | B | A | A | A |
|  | Gas resistance | B | B | A | A | C | B | A | A |
|  | Light resistance | A | A | A | A | B | B | B | A |

TABLE 5

|  |  | Comparative Example 1 | Comparative Example 2 | Comparative Example 3 | Comparative Example 4 | Comparative Example 5 |
|---|---|---|---|---|---|---|
| Ink used | Glitter ink composition | Silver ink | Silver ink | Silver ink | Silver ink | Aluminum ink |
|  | Resin ink composition | CL17 | CL18 | CL19 | — | — |
| Evaluation results | Metallic gloss properties | C | C | C | A | A |
|  | Scratch resistance | D | B | D | D | D |
|  | Water resistance | A | A | A | C | C |
|  | Gas resistance | B | B | D | D | C |
|  | Light resistance | C | B | C | C | A |

As shown in Tables 3 and 4, all the evaluation samples of the Examples had excellent scratch resistance and water resistance while maintaining metallic gloss properties. In addition, since the evaluation samples of Examples 8 to 10 contained any of the silica particles, the resin having the isoprene skeleton, and the UV absorber, at least one of gas resistance and light resistance was excellent.

On the other hand, as shown in Table 5, the evaluation samples of Comparative Examples 1 to 3 were formed using the resin ink compositions that do not contain any of the urethane-based resin, the ester-based resin, and the fluorene-based resin. Therefore, the metallic gloss properties of the glitter region were significantly degraded.

In addition, the evaluation samples of Comparative Examples 4 and 5 were formed without the use of the resin ink compositions. Therefore, the scratch resistance and water resistance of the glitter region were not favorable.

The invention is not limited to the above-described embodiments, and various modifications can be made. For example, the invention includes substantially the same configuration (for example, configurations having the same functions, methods, and results, or configurations having same purposes and effects) as the configurations described in the embodiments. In addition, the invention includes configurations in which parts that are not essential to the configurations described in the embodiments are substituted. In addition, the invention includes configurations that exhibit the same actions and effects as those of the configurations described in the embodiments and configurations that achieve the same objects. In addition, the invention includes configurations in which well-known techniques are added to the configurations described in the embodiments.

What is claimed is:

1. An ink jet resin ink composition comprising:
   at least one resin selected from a urethane-based resin, an ester-based resin, and a fluorene-based resin; and
   at least one selected from a polyolefin wax, silica particles, a resin having an isoprene skeleton, and an ultraviolet absorber,
   wherein the ink jet resin ink does not include a colorant,
   the urethane-based resin and the ester-based resin are contained in emulsion forms, and
   average particle sizes of the urethane-based resin and the ester-based resin in the emulsion forms are greater than or equal to 10 nm and smaller than or equal to 135 nm.

2. The ink jet resin ink composition according to claim 1,
wherein glass-transition temperatures (Tg) of the urethane-based resin and the ester-based resin are higher than or equal to −70° C. and less than or equal to 80° C., and a glass-transition temperature (Tg) of the fluorene-based resin is higher than or equal to 0° C.

3. The ink jet resin ink composition according to claim 1,
wherein the fluorene-based resin is obtained by a reaction of a polyol component which contains a first diol that contains a fluorene skeleton and a second diol that has a hydrophilic group with a polyisocyanate compound.

4. The ink jet resin ink composition according to claim 1,
wherein an average particle size of the silica particles is smaller than or equal to 100 nm.

5. The ink jet resin ink composition according to claim 1,
wherein an average particle size of the ultraviolet absorber is greater than or equal to 20 nm and smaller than or equal to 100 nm.

6. An ink jet recording method comprising:
discharging liquid droplets of the ink jet resin ink composition according to claim 1 so as to adhere onto a glitter region that contains a glitter pigment formed on a recording medium.

7. An ink jet recording method comprising:
discharging liquid droplets of the ink jet resin ink composition according to claim 2 so as to adhere onto a glitter region that contains a glitter pigment formed on a recording medium.

8. An ink jet recording method comprising:
discharging liquid droplets of the ink jet resin ink composition according to claim 3 so as to adhere onto a glitter region that contains a glitter pigment formed on a recording medium.

9. An ink jet recording method comprising:
discharging liquid droplets of the ink jet resin ink composition according to claim 4 so as to adhere onto a glitter region that contains a glitter pigment formed on a recording medium.

10. An ink jet recording method comprising:
discharging liquid droplets of the ink jet resin ink composition according to claim 5 so as to adhere onto a glitter region that contains a glitter pigment formed on a recording medium.

11. A recorded matter which is obtained by causing the resin ink composition according to claim 1 to adhere onto a glitter region that contains a glitter pigment formed on a recording medium.

12. A recorded matter which is obtained by causing the resin ink composition according to claim 2 to adhere onto a glitter region that contains a glitter pigment formed on a recording medium.

13. A recorded matter which is obtained by causing the resin ink composition according to claim 3 to adhere onto a glitter region that contains a glitter pigment formed on a recording medium.

14. A recorded matter which is obtained by causing the resin ink composition according to claim 4 to adhere onto a glitter region that contains a glitter pigment formed on a recording medium.

* * * * *